US008645998B2

(12) United States Patent
Kim et al.

(10) Patent No.: US 8,645,998 B2
(45) Date of Patent: Feb. 4, 2014

(54) VIDEO SIGNAL PROCESSING APPARATUS AND CONTROL METHOD THEREOF

(75) Inventors: Yun-sung Kim, Seoul (KR); Gum-sool Kim, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 747 days.

(21) Appl. No.: 11/717,082

(22) Filed: Mar. 13, 2007

(65) Prior Publication Data

US 2007/0226622 A1   Sep. 27, 2007

(30) Foreign Application Priority Data

Mar. 22, 2006   (KR) .................. 10-2006-0026253

(51) Int. Cl.
*G06F 13/00* (2006.01)
*G06F 3/00* (2006.01)

(52) U.S. Cl.
USPC ............................................. 725/38; 715/810

(58) Field of Classification Search
None
See application file for complete search history.

(56) References Cited

U.S. PATENT DOCUMENTS

| | | | | |
|---|---|---|---|---|
| 4,595,070 | A * | 6/1986 | Hodges | 180/125 |
| 6,425,129 | B1 * | 7/2002 | Sciammarella et al. | 725/38 |
| 2002/0054017 | A1 * | 5/2002 | Agata et al. | 345/157 |
| 2005/0160375 | A1 * | 7/2005 | Sciammarella et al. | 715/838 |
| 2006/0001771 | A1 | 1/2006 | Hayakawa | |

FOREIGN PATENT DOCUMENTS

| | | |
|---|---|---|
| CN | 1158046 A | 8/1997 |
| CN | 1269097 A | 10/2000 |
| CN | 1706178 A | 12/2005 |
| EP | 1 538 829 A1 | 6/2005 |
| JP | 2001-312350 A | 11/2001 |
| JP | 2002-175139 A | 6/2002 |
| KR | 20010022087 A | 3/2001 |
| KR | 2001-0083928 A | 9/2001 |
| KR | 1020050074762 A | 7/2005 |
| WO | 9904561 A1 | 1/1999 |
| WO | WO 99/04561 A1 | 1/1999 |
| WO | WO 01/16690 * | 3/2001 |

OTHER PUBLICATIONS

Communication dated Jun. 15, 2012 issued by the Korean Intellectual Property Office in counterpart Korean Patent Application No. 10-2006-0026253.

* cited by examiner

*Primary Examiner* — Jason J Chung
*Assistant Examiner* — James R Marandi
(74) *Attorney, Agent, or Firm* — Sughrue Mion, PLLC

(57) ABSTRACT

A video signal processing apparatus, comprises: a display unit; an user interface (UI) generating unit that generates a UI including a channel information array in which a plurality of channel informations are arranged to be displayed to the display unit; a user inputting unit that receives a first moving instruction and a second moving instruction for moving the channel information array, the second moving instruction including a position information about moving of the channel information array; and a control unit that controls the UI generating unit so that the channel informations arranged in the channel information array can move one by one if the first moving instruction is received, and the channel informations arranged in the channel information array can move in an manner that corresponds to the position information if the second moving instruction is received.

16 Claims, 6 Drawing Sheets

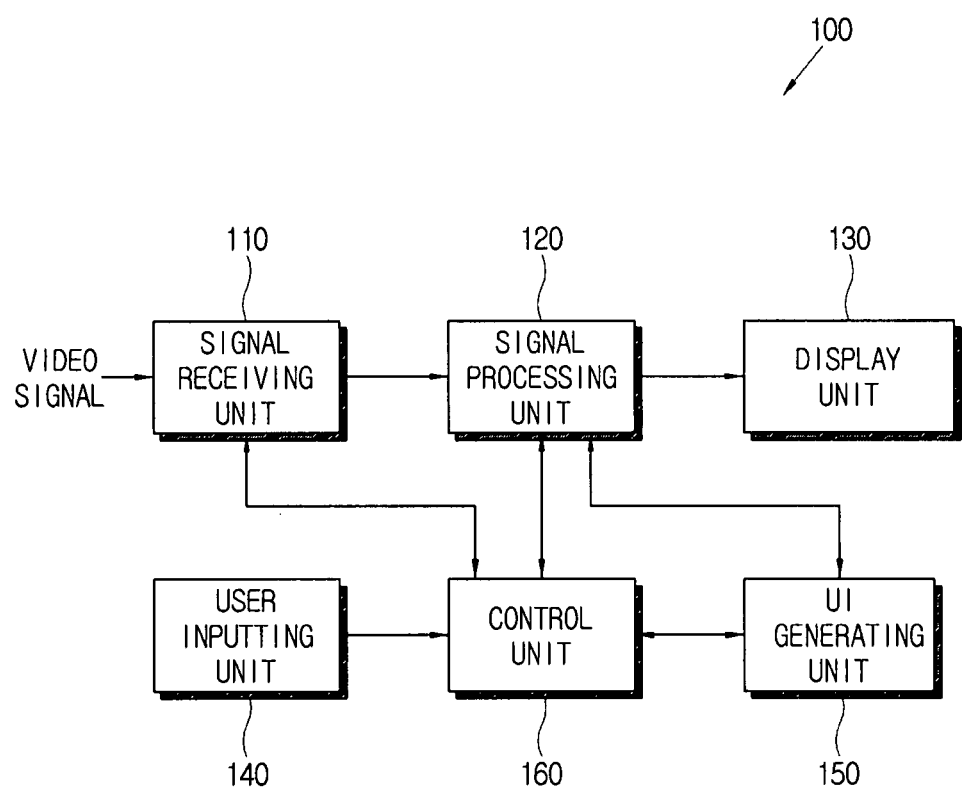

FIG. 5
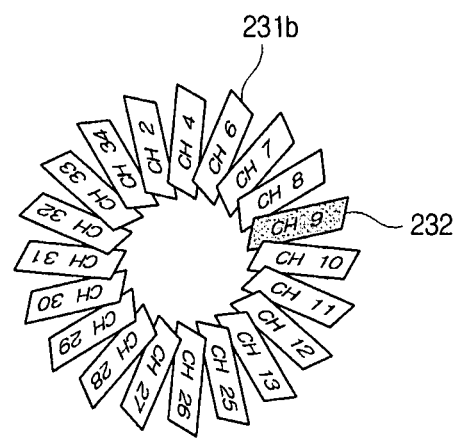
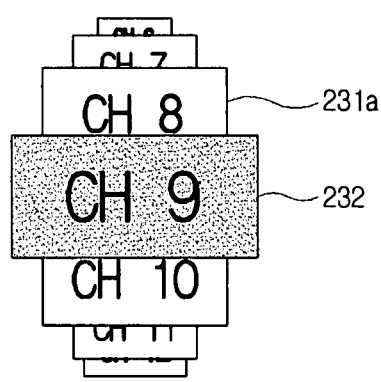

VIDEO SIGNAL PROCESSING APPARATUS AND CONTROL METHOD THEREOF

CROSS-REFERENCE TO RELATED APPLICATIONS

This application claims priority from Korean Patent Application No. 2006-0026253, filed on Mar. 22, 2006, in the Korean Intellectual Property Office, the disclosure of which is incorporated herein by reference.

BACKGROUND OF INVENTION

1. Field of Invention

Methods and apparatuses consistent with the present invention relate to video signal processing, and more particularly, to video signal processing for rapidly and conveniently searching a plurality of channel informations.

2. Description of the Related Art

Generally, a video signal processing apparatus such as a TV, or the like receives a video signal from a broadcasting station, etc., and processes the received video signal in order to display an image based on the processed video signal. The video signal includes a broadcasting signal provided by a TV broadcast. The video signal processing apparatus receives one program from one channel among a plurality of channels through the broadcasting signal.

The video signal processing apparatus also displays information about a channel (hereinafter referred to as 'channel information') so that a user can select a channel using the channel information. The channel information includes channel number, channel name, information about contents thereof, etc.

The video signal processing apparatus displays information for a plurality of channels (i.e., a plurality of channel informations), respectively. Thus, the video signal processing apparatus enables a user to select one of the plural channel informations and receives a video signal of a channel corresponding to the selected channel information.

However, in the case of digital TV broadcastings, since there are many channels, the video signal processing apparatus displays many channel informations corresponding to the respective channels. Thus, it is inconvenient for a user to select a desired channel with the use of the displayed channel informations.

SUMMARY OF THE INVENTION

Accordingly, it is an aspect of the present invention to provide a video signal processing apparatus and a control method therefor including a UI (user interface) which is capable of variably displaying an arrangement of a plurality of channel informations so that the channel informations can move in a manner that corresponds to a moving instruction. Thereby, a user can rapidly and conveniently search the channel informations.

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to a first aspect of the present invention, there is provided a video signal processing apparatus, comprising: a display unit; a UI generating unit that generates an user interface (UI) including a channel information array in which a plurality of channel informations are arranged to be displayed to the display unit; a user inputting unit that receives a first moving instruction and a second moving instruction for moving the channel information array, the second moving instruction including a position information regarding moving of the channel information array; and a control unit controlling the UI generating unit so that the channel informations arranged in the channel information array can move one by one if the first moving instruction is received, and the channel informations arranged in the channel information array can move in a manner that corresponds to the position information if the second moving instruction is received.

The channel information array can have a substantially circular shape.

The channel information array can have a substantially linear shape.

The UI can include a selection mark indicating one channel information which is selected out of the channel informations arranged in the channel information array.

The UI can include a detailed channel information illustrating contents of the channel information selected by the selection mark.

The detailed channel information can include at least one of a thumbnail image and a text illustrating the contents of the selected channel information.

The user inputting unit can include a button corresponding to at least one moving direction of the channel informations for receiving the first moving instruction.

The user inputting unit can include a jog shuttle for receiving the second moving instruction.

A moving speed of the channel informations can be substantially the same as a rotation speed of the jog shuttle.

The channel informations can move in an amount corresponding to an amount of rotation or a rotation angle of the jog shuttle.

According to a second aspect of the present invention, there is provided a control method for an video signal processing apparatus, comprising: displaying an user interface (UI) including a channel information array in which a plurality of channel informations are arranged; receiving at least one of a first moving instruction and a second moving instruction for moving the channel information array, the second moving instruction including a position information regarding moving of the channel information array; and moving the channel informations arranged in the channel information array one by one if the first moving instruction is received, and moving the channel informations arranged in the channel information array in a manner that corresponds to the position information if the second moving instruction is received.

The UI displaying can include displaying the channel information array to have a substantially circular shape.

The UI displaying can include displaying the channel information array to have a substantially linear shape.

The UI displaying can include displaying a selection mark indicating one channel information which is selected out of the channel informations arranged in the channel information array.

The UI displaying can include displaying a detailed channel information illustrating contents of the channel information selected by the selection mark.

The detailed channel information can include at least one of a thumbnail image and a text illustrating the contents of the selected channel information.

BRIEF DESCRIPTION OF THE DRAWINGS

The above and/or other aspects of the prevent invention will become apparent and more readily appreciated from the following description of the exemplary embodiments, taken in conjunction with the accompany drawings, in which:

FIG. 2 is a block diagram of the video signal processing apparatus in FIG. 1;

FIG. 5 is a flowchart illustrating an operation of the video signal processing apparatus in FIG. 1.

DETAILED DESCRIPTION OF THE EXEMPLARY EMBODIMENTS

Figure 1:
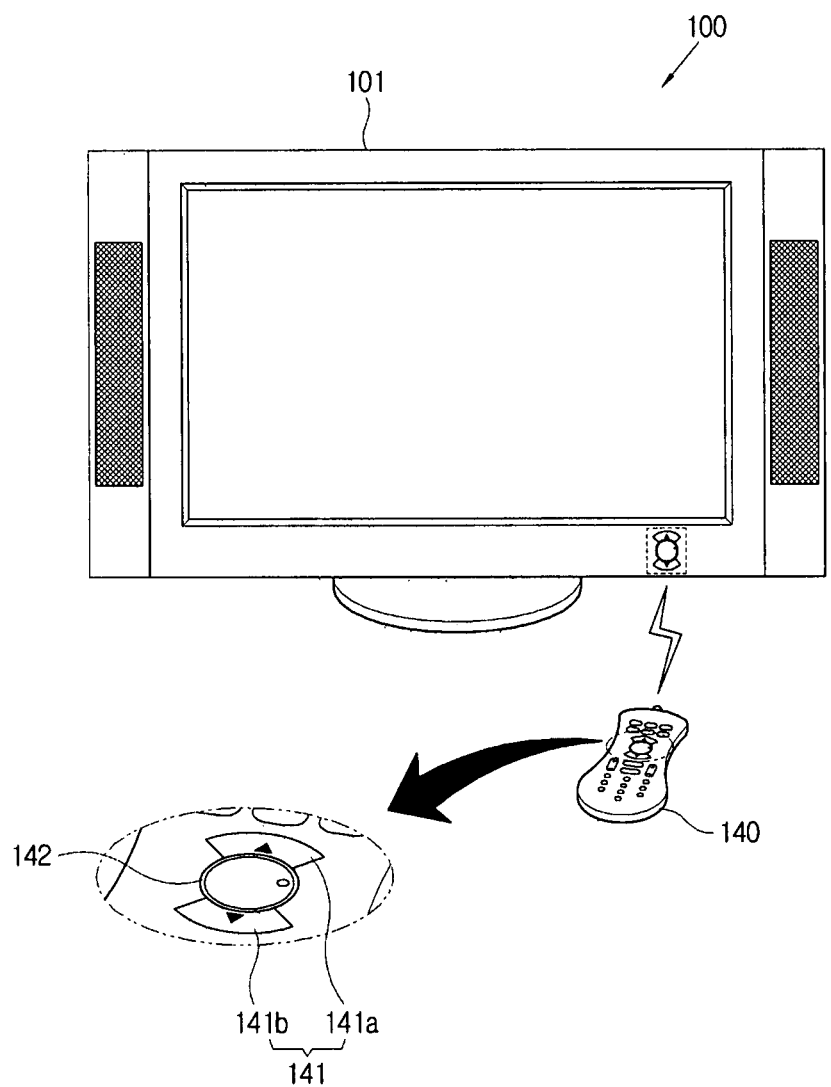
FIG. 1 is a perspective view illustrating a video signal processing apparatus according to a first exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

As shown in FIGS. 1 and 2, a video signal processing apparatus 100 may be provided as a TV. The video signal processing apparatus 100 includes a signal receiving unit 110, a signal processing unit 120, a display unit 130, a user inputting unit 140, a UI (user interface) generating unit 150, and a control unit 160.

The video signal processing apparatus 100 receives a video signal from a broadcasting station (not shown), processes the received video signal, and displays an image based on the processed video signal. The video signal may include a broadcasting signal provided by a TV broadcast. The video signal processing apparatus 100 receives one channel of a plurality of channels through the broadcasting signal. The broadcasting signal may include a signal provided by a digital TV broadcast.

The video signal processing apparatus 100 displays a channel information so that a user can select a channel by using the channel information. The channel information may include a channel number, a channel name, information about contents thereof, etc.

The signal receiving unit 110 receives a video signal of a channel selected by a user. The signal receiving unit 110 tunes to a frequency corresponding to the selected channel in order to receive the video signal under control of the control unit 160.

The signal processing unit 120 processes the video signal received by the signal receiving unit 110 so that the display unit 130 can display an image based thereon. The signal processing unit 120 may perform an image enhancement with respect to the received image signal for enhancing the quality of an image to be displayed, and a scaling for adjusting an image resolution so that an image to be displayed has a suitable size. Also, the signal processing unit 120 may perform deinterlacing with respect to an interlaced image signal.

The display unit 130 receives the video signal processed by the signal processing unit 120 and displays an image based thereon. The display unit 130 displays a UI including a channel information. The display unit 130 may be provided as a CRT (cathode ray tube), an LCD (liquid crystal display), a PDP (plasma display panel), a DLP (digital light processing), an OLED (organic light emitting diode), an SED (surface-conduction electron-emitter display), an FED (field emission display), etc.

The user inputting unit 140 receives an instruction of a user and supplies it to the control unit 160. The user inputting unit 140 receives a first moving instruction and a second moving instruction with respect to a channel information array. The second moving instruction includes a speed information. Referring to FIG. 1, the user inputting unit 140 may be a remote control or an operation panel (not shown) provided to a TV casing body 101. The user inputting unit 140 includes a button 141 corresponding to the first moving instruction and a jog shuttle 142 corresponding to the second moving instruction. The button 141 includes an upper button 141a and a lower button 141b respectively corresponding to an upward direction and a downward direction. The jog shuttle 142 is capable of rotating by means of an operation of a user, and transmits information about a rotation direction (a clockwise direction or a counterclockwise direction) and a position information about the amount of rotation (or a rotation angle) to the control unit 160.

The UI generating unit 150 generates a UI to be displayed by the display unit 130 under control of the control unit 160. The UI includes a channel information array including a plurality of channel informations arranged to be displayed by the display unit 130.

Figure 3A:
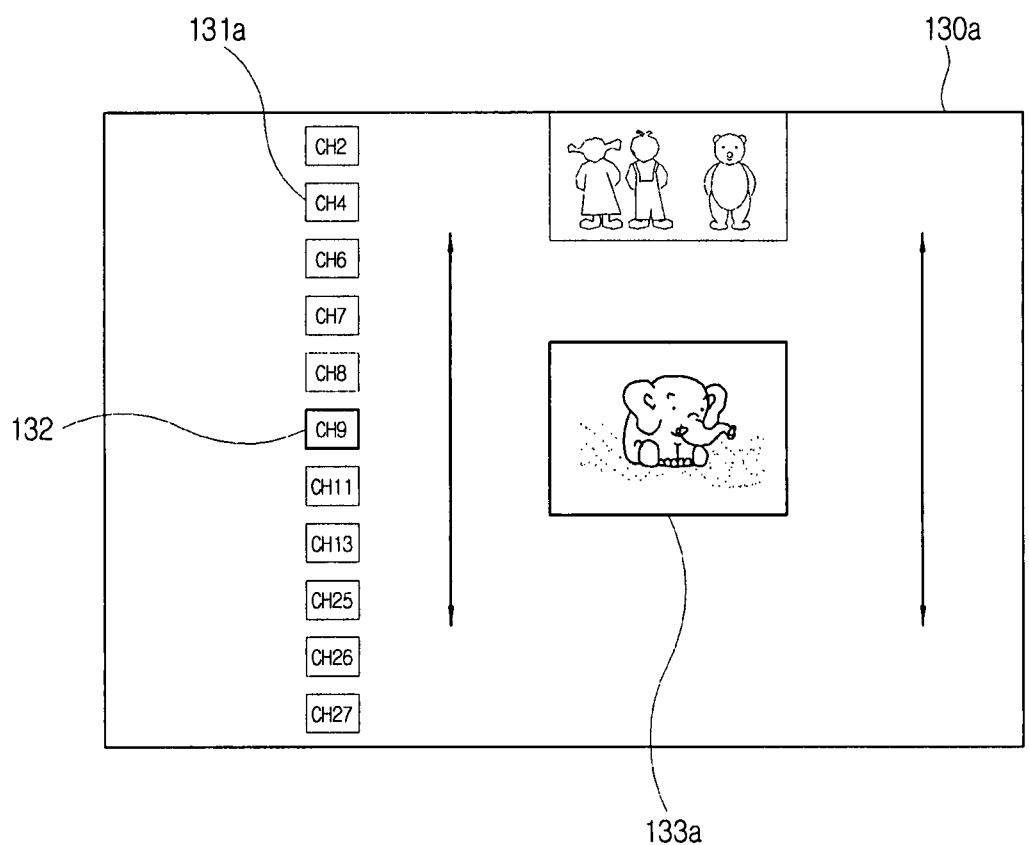
FIGS. 3A and 3B respectively illustrate a first UI and a second UI generated by a UI generating unit of the video signal processing apparatus in FIG. 1.
Figure 3B:
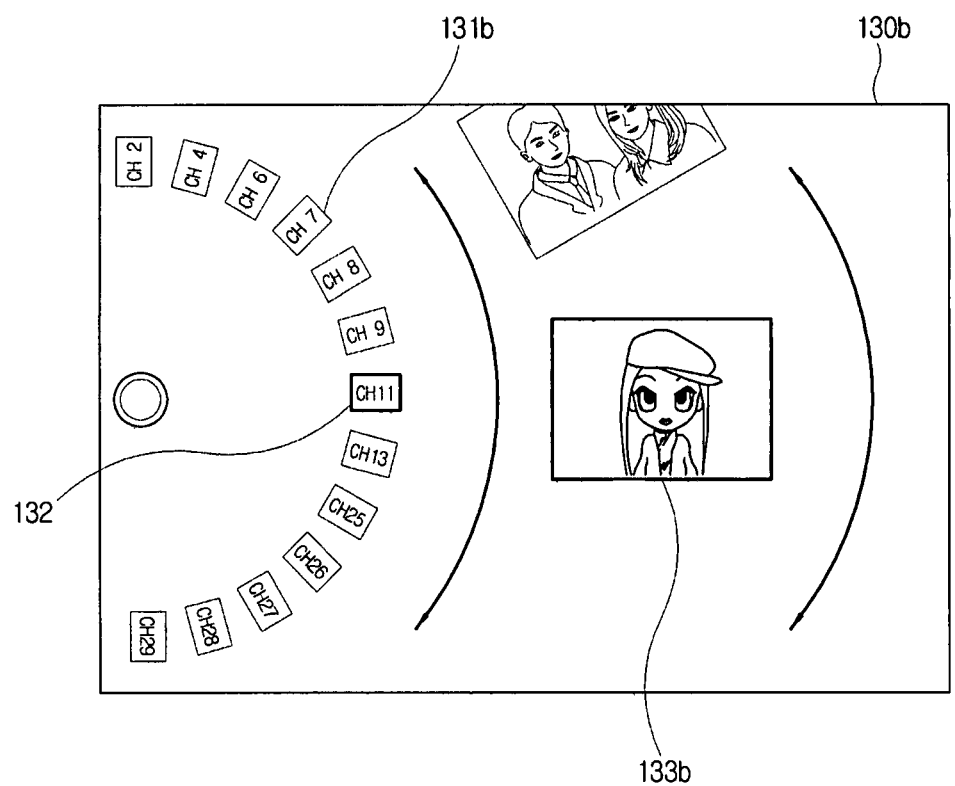

FIG. 3A and FIG. 3B respectively illustrate a first UI 130a and a second UI 130b generated by the UI generating unit 150.

As shown in FIG. 3A, the first UI 130a includes a first channel information array 131a in which a plurality of channel informations are displayed. The channel informations include channel numbers, and are sorted in an ascending order or in a descending order. The first channel information array 131a is displayed in a substantially straight line. The first UI 130a further includes a selection mark 132 indicating one channel information selected out of the channel informations arranged in the first channel information array 131a. The selection mark 132 may be highlighted. Here, the first UI 130a further includes a first detailed channel information 133a illustrating in detail contents of the channel information selected by the selection mark 132. The first detailed channel information 133a may include program contents of a channel corresponding to the selected channel information.

As shown in FIG. 3B, the UI generating unit 150 generates a second UI 130b. The second UI 130b includes a second channel information array 131b having an essentially circular shape. The second UI 130b further includes a selection mark 132, and a second detailed channel information 133b illustrating detailed contents of a channel information selected by the selection mark 132. The first detailed channel information 133a and the second detailed channel information 133b may be provided as a thumbnail image representing program contents of the selected channel or a text explaining the program contents thereof.

The control unit 160 controlling the video signal processing apparatus controls the signal receiving unit 110, the signal processing unit 120, and the UI generating unit 150 according to an order of a user inputted through the user inputting unit 140.

If the first moving instruction is inputted through the user inputting unit 140, the control unit 160 controls the UI generating unit 150 so that the first UI 130a can be displayed and the channel informations arranged in the first channel information array 131a can be moved one by one.

For example, referring to FIG. 3A, if 'CH9' is selected by the selection mark 132, and the upper button 141a of the user inputting unit 140 is pushed, the control unit 160 causes the respective channel informations arranged in the first channel information array 131*a* to move upwardly so that 'CH11' is selected by the selection mark 132. If 'CH9' is selected by the selection mark 132, and the lower button 141*b* of the user inputting unit 140 is pushed, the control unit 160 causes the respective channel informations arranged in the first channel information array 131*a* to move downwardly so that 'CH8' can be selected by the selection mark 132. Here, the control unit 160 constantly maintains the sorted order of the channel informations arranged in the first channel information array 131*a*. Also, the control unit 160 controls the UI generating unit 150 so that the first detailed channel information 133*a* can be displayed by moving upwardly or downwardly to correspond to moving of the channel informations.

Accordingly, the video signal processing apparatus 100 can move the channel informations arranged in the first channel information array 131*a* one by one, to thereby enable a user to search channels in detail (referring to 'simple search').

If instead the second moving instruction including the position information is inputted through the user inputting unit 140, the control unit 160 controls the UI generating unit 150 so that the second UI 130*b* can be displayed and the channel informations arranged in the second channel information array 131*b* are moved in a manner corresponding to the position information.

For example, referring to FIG. 3B, if the 'CH11' is selected by the selection mark 132, and the jog shuttle 142 of the user inputting unit 140 is turned approximately 90 degrees counterclockwise, the control unit 160 moves the respective channel informations arranged in the second channel information array 131*b* counterclockwise six times to correspond to the 90 degrees so that 'CH29' can be selected by the selection mark 132. If 'CH11' is selected by the selection mark 132, and the jog shuttle 142 of the user inputting unit 140 is turned approximately 90 degrees clockwise, the control unit 160 moves the respective channel informations arranged in the second channel information array 131*b* clockwise six times to correspond to the 90 degrees so that 'CH2' can be selected by the selection mark 132.

Here, the sorted order of the channel informations arranged in the second channel information array 131*b* is constantly maintained. Also, the control unit 160 controls the UI generating unit 150 so that the second detailed channel information 133*b* can rotate clockwise or counterclockwise about the center of the second channel information array 131*b* in a manner that corresponds to the moving of the channel informations. Also, it is preferable that a moving speed of the channel informations is substantially the same as a rotation speed of the jog shuttle 142.

Accordingly, the video signal processing apparatus 100 can move the channel informations arranged in the second channel information array 131*b* to correspond to the amount of rotation or a rotation angle of the jog shuttle 142, to thereby enable a user to rapidly search a lot of channels (referring to 'variable search').

Also, if an instruction is inputted through the jog shuttle 142 during the simple search or an instruction is inputted through the button 141 during the variable search, the control unit 160 controls the UI generating unit 150 so that the first UI 130*a* and the second UI 130*b* can be immediately converted to each other.

The control unit 160 may be embodied as a computer program. In this case, the video signal processing apparatus 100 further includes a ROM and a RAM storing the computer program, and a micro processor running the computer program.

Figure 4:
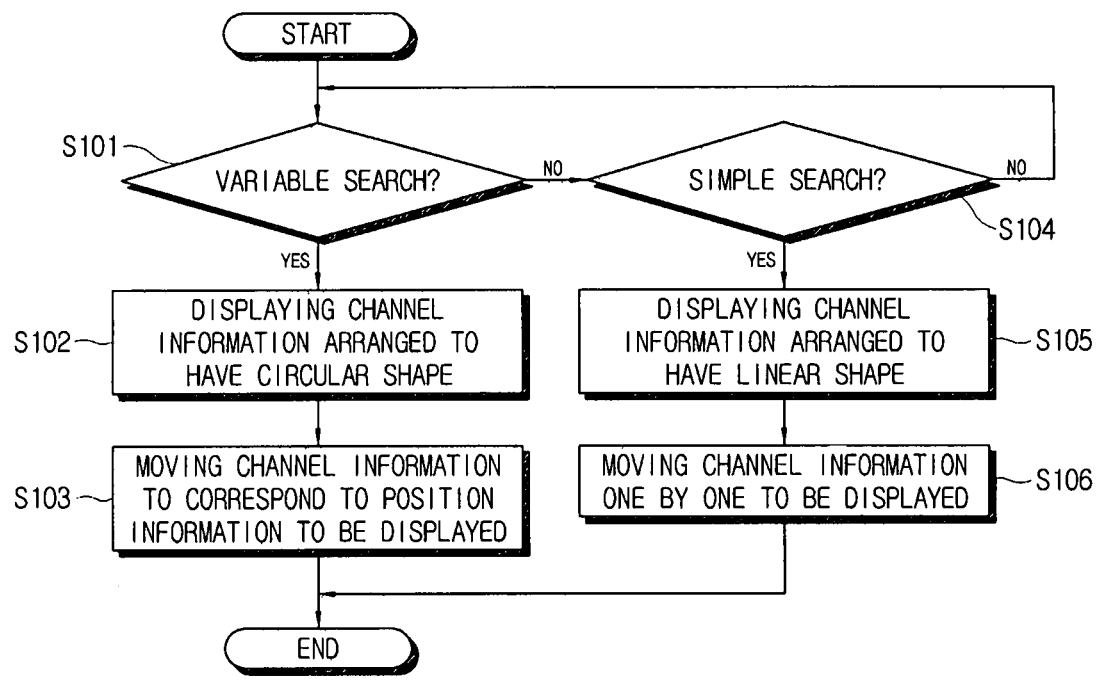
FIG. 4 illustrates a first channel information array and a second channel information array of an video signal processing apparatus according to a second exemplary embodiment of the present invention.

Hereinafter, a video signal processing apparatus 100 according to a second exemplary embodiment of the present invention will be described by referring to FIG. 4.

As shown in FIG. 5, a video signal processing apparatus 100 according to a second exemplary embodiment of the present invention includes a first channel information array 231*a* and a second channel information array 231*b* having a three dimensional configuration. In the second information array 231*b*, a plurality of approximate rectangles displaying respective channel informations are arranged to have a ring-like shape. The second channel information array 231*b* preferably displays as many channel informations as possible for a rapid and overall search. The first channel information array 231*a* is displayed as a state in which the ring of the second channel information array 231*b* is rotated approximately 90 degrees about a central axis thereof. In the first channel information array 231*a*, a channel information selected by a selection mark 232 and some channel informations arranged adjacent thereto may be displayed.

Hereafter, an operation of the video signal processing apparatus according to the first exemplary embodiment of the present invention will be described by referring to FIGS. 1 to 4.

As shown in FIGS. 1 to 4, at first, the control unit 160 determines whether an instruction through the user inputting unit 140 is the variable search (S101). If the jog shuttle 142 of the user inputting unit 140 is turned (variable search), the control unit 160 displays the second UI 130*b* including the second channel information array 131*b* in which the channel informations are arranged in a circular shape (S102). Then, the control unit 160 moves the channel informations in a rotation direction of the jog shuttle 142 in a manner that corresponds to the position information, that is, the amount of rotation or a rotation angle, and displays the moved channel informations (S103).

In the case that an instruction through the user inputting unit 140 is not the variable search, the control unit 160 determines whether the instruction is for a simple search (S104). If the button 141 of the user inputting unit 140 is pushed, the control unit 160 displays the first UI 130*a* including the first channel information array 131*a* in which the channel informations are arranged in a straight line (S105). Then, the control unit 160 moves the channel informations upward or downward one by one when the upper button 141*a* or the lower button 141*b* is pushed (S106).

The channel informations are arranged to have a circular shape or a linear shape, but alternatively, the channel informations may be arranged to have an oval shape or other various shapes. Also, the video signal processing apparatus 100 receives the first moving instruction and the second moving instruction. However, alternatively, the video signal processing apparatus according to the present invention may receive at least three moving instructions with respect to channel informations to have different types. Here, the UI generating unit may preferably generate various UIs to correspond to the respective moving instructions.

As described above, a video signal processing apparatus and a control method therefor according to the exemplary embodiments of the present invention can provide a UI allowing a user to rapidly and conveniently search a plurality of channel informations.

A video signal processing apparatus and a control method therefor according to the exemplary embodiments of the present invention can display a UI in which a plurality of channel informations are arranged, and variably display an arrangement of the channel informations to correspond to a moving instruction, to thereby rapidly and conveniently search the channel informations.

Especially, a video signal processing apparatus and a control method therefor according to the exemplary embodiments of the present invention can move channel information displayed in an array one by one when a moving instruction is inputted, to thereby allow a user to search channels in detail.

Also, an video signal processing apparatus and a control method therefor according to the exemplary embodiments of the present invention can movably display channel informations in a manner that corresponds to the amount of rotation or a rotation angle of a jog shuttle, to thereby allow a user to rapidly search a lot of channels.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A video signal processing apparatus, comprising:
   a user interface (UI) generating unit that selectively generates a first UI including a first channel information array and a second UI including a second channel information array, in which a plurality of channel informations are displayed by a display unit, and wherein the same channel information is displayed on the first UI and the second UI;
   a user inputting unit that receives a first moving instruction and a second moving instruction for moving the first channel information array and the second channel information array, respectively, the second moving instruction including an amount of rotation input to the user inputting unit; and
   a control unit that controls the UI generating unit so that the plurality of channel informations arranged in the first channel information array can move one by one if the first moving instruction is received, and so that the plurality of channel informations arranged in the second channel information array can move in a manner that corresponds to the amount of rotation if the second moving instruction is received,
   wherein the first channel information array has a substantially linear shape and the second channel information array has a substantially circular shape.

2. The video signal processing apparatus according to claim 1, wherein the first UI and the second UI further comprise a selection mark indicating one channel information which is selected out of the plurality of channel informations arranged in the first channel information array and second channel information array, respectively.

3. The video signal processing apparatus according to claim 2, wherein the first UI and the second UI further comprise a detailed channel information illustrating contents of the channel information selected by the selection mark.

4. The video signal processing apparatus according to claim 3, wherein the detailed channel information comprises at least one of a thumbnail image and a text illustrating the contents of the selected channel information.

5. The video signal processing apparatus according to claim 1, wherein the user inputting unit comprises a button corresponding to at least one moving direction of the plurality of channel informations for receiving the first moving instruction.

6. The video signal processing apparatus according to claim 1, wherein the user inputting unit comprises a jog shuttle for receiving the second moving instruction.

7. The video signal processing apparatus according to claim 6, wherein a moving speed of the plurality of channel informations is substantially the same as a rotation speed of the jog shuttle.

8. The video signal processing apparatus according to claim 6, wherein the plurality of channel informations move in an amount corresponding to an amount of rotation or a rotation angle of the jog shuttle.

9. The video signal processing apparatus according to claim 1, wherein the first moving instruction comprises information corresponding to direction of moving in the first channel information array, and the second moving instruction comprises information corresponding to direction and amount of moving in the second channel information array.

10. The video signal processing apparatus according to claim 1, wherein the control unit controls the UI generating unit to switch the first UI to the second UI if a second moving instruction is received, and wherein the control unit controls the UI generating unit to switch the second UI to the first UI if a first moving instruction is received.

11. The video signal processing apparatus according to claim 1, wherein the display unit displays only one of the first UI or second UI at a time.

12. The video signal processing apparatus according to claim 1, wherein the first moving instruction and the second moving instruction each comprise selection information indicating which of the first UI or second UI to display and position information regarding moving their respective first and second channel information arrays.

13. A control method for a video signal processing apparatus, comprising:
    selectively displaying a first user interface (UI) including a first channel information array and a second UI including a second channel information array, in which a plurality of channel informations are arranged, and wherein the same channel information is displayed on the first UI and the second UI;
    receiving at least one of a first moving instruction and a second moving instruction for moving at least one of the first channel information array and the second channel information array, respectively, the second moving instruction including an amount of rotation input to the user inputting unit; and
    moving the plurality of channel informations arranged in the first channel information array one by one if the first moving instruction is received, and moving the plurality of channel informations arranged in the second channel information array in a manner that corresponds to the amount of rotation if the second moving instruction is received,
    wherein the first channel information array has a substantially linear shape and the second channel information array has a substantially circular shape,
    wherein the first channel information array and the second channel information array are immediately converted to each other based on an instruction, and
    wherein the instruction is one of the first moving instruction and the second moving instruction.

14. The control method according to claim 13, wherein the first UI and second UI displaying further comprise displaying a selection mark indicating one channel information which is selected out of the plurality of channel informations arranged in the first channel information array and the second channel information array, respectively.

15. The control method according to claim 14, wherein the first UI and second UI displaying further comprise displaying a detailed channel information illustrating contents of the channel information selected by the selection mark.

16. The control method according to claim 15, wherein the detailed channel information comprises at least one of a thumbnail image and a text illustrating the contents of the selected channel information.

* * * * *